United States Patent [19]

Taylor et al.

[11] 4,365,647

[45] Dec. 28, 1982

[54] POWER TRANSMISSION

[75] Inventors: Henry D. Taylor, Pontiac; Robert H. Breeden, Metamora, both of Mich.

[73] Assignee: Sperry Corporation, Troy, Mich.

[21] Appl. No.: 117,934

[22] Filed: Feb. 4, 1980

[51] Int. Cl.[3] .......... F16K 31/383

[52] U.S. Cl. .......... 137/489; 137/492; 137/495

[58] Field of Search .......... 137/489, 492, 492.5, 137/495; 251/38, 63.4, 28

[56] References Cited

U.S. PATENT DOCUMENTS

| | | | |
|---|---|---|---|
| 2,043,453 | 6/1936 | Vickers . | |
| 2,737,974 | 3/1956 | Renick | 137/489 |
| 2,805,038 | 9/1957 | Towler | 251/38 X |
| 3,410,304 | 11/1968 | Paul | 251/63.4 X |
| 3,809,201 | 5/1974 | Miyanishi | 251/63.4 X |
| 4,138,928 | 2/1979 | Peterson | 137/489 X |
| 4,172,466 | 10/1979 | Pattarini | 137/495 X |
| 4,201,052 | 5/1980 | Breeden et al. | 60/445 |
| 4,237,920 | 12/1980 | Norman | 251/63.4 X |

*Primary Examiner*—Alan Cohan

*Attorney, Agent, or Firm*—Barnes, Kisselle, Raisch & Choate

[57] ABSTRACT

A multifunction hydraulic flow metering valve and a circuit therefore comprising a main valve, a bleed flow orifice, and a servo valve acting with the main valve provides for proportional speed control for lowering loads and as an anti-cavitation check valve. A pilot valve in the circuit acting with the main valve provides the circuit with a pressure limiting relief valve.

25 Claims, 3 Drawing Figures

POWER TRANSMISSION

This application discloses and claims matter disclosed in copending U.S. patent application Ser. No. 024,058, filed Mar. 26, 1979 now U.S. Pat. No. 4,201,052, having a common assignee with the present patent application.

BACKGROUND AND SUMMARY

This invention relates to a hydraulic flow metering circuit and a metering valve therefor and particularly to such circuits and valves having multiple functions.

In the control of return fluid flow from loads applied to hydraulic actuators such as cylinders on earthmoving and construction vehicles, it is customary to provide spool-type valve elements with each valve element serving various individual functions such as speed control of lowering loads, limiting excessive pressure, preventing or minimizing cavitation in the hydraulic cylinders, and holding a load stationary in a preselected position.

However, use of spool-type valve elements having a movable spool member lead to certain disadvantages, such as instability of the spool member while throttling fluid flow to decelerate a lowering load resulting in erratic or jerking movements of the load, and drifting of a stationary load from a preselected position due to leakage of fluid past clearances necessary to proper operation of the spool member.

The present invention is directed to a circuit comprising a single hydraulic flow metering valve which will function as a proportional speed control valve for lowering loads, a pressure limiting relief valve, and an anti-cavitation check valve.

In accordance with the present invention, a poppet type main valve meters return fluid flow from loaded cylinders in response to a variable orifice formed in the main valve, which is controlled by an integral servo valve, and to fluid flow through a bleed flow orifice which is controlled by a pilot valve. The metering valve is designed so that the following three different valve functions can be accomplished:

When the main valve is controlled by fluid flow through the variable orifice, the servo valve provides a machine operator with a proportional speed control for lowering loads.

If cylinder fluid pressure drops below return fluid pressure in the system, the main valve will open allowing fluid from the return to flow to the cylinder thereby operating as an anti-cavitation check valve.

The pilot valve controls bleed flow from the bleed flow orifice through the main valve to provide operation as a pressure limiting relief valve.

A fuller understanding of the invention may be had from consideration of the following description and claims taken together with the accompanying drawings.

DETAILED DESCRIPTION

Figure 1:
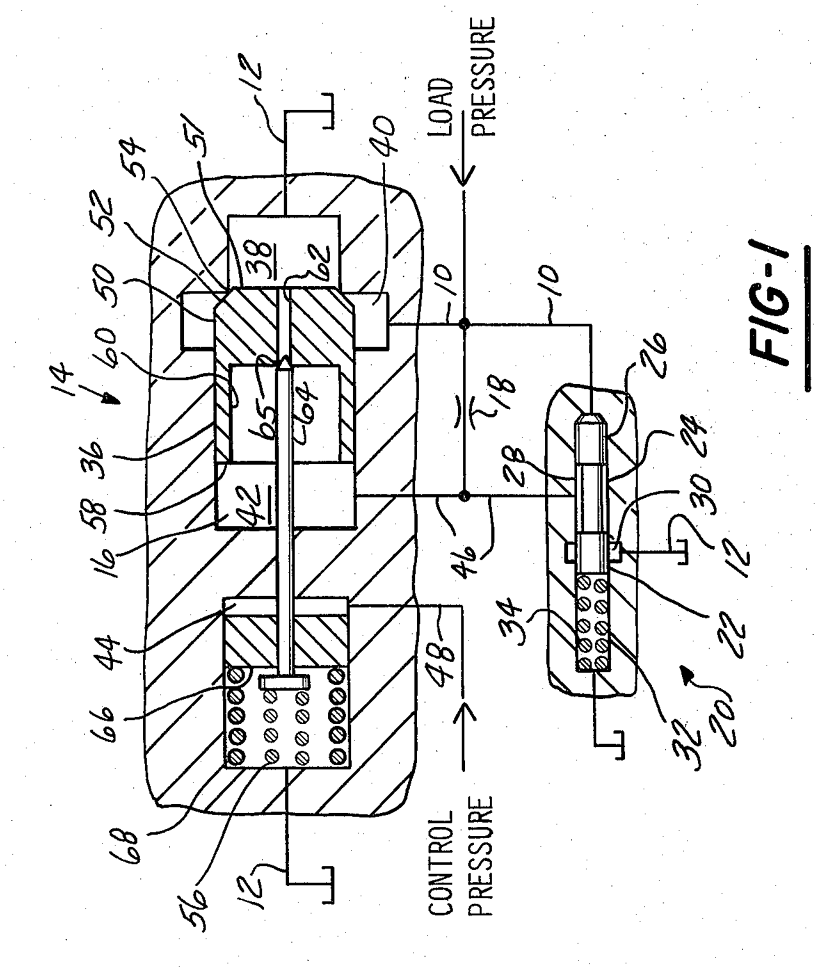
FIG. 1 is a schematic of the hydraulic circuit embodying the invention.

Referring to FIG. 1, the hydraulic control valve circuit embodying the invention includes a load pressure line 10 adapted to be connected to a source of load pressure and a return flow line 12 adapted to be connected to the return flow of a pump or other source of fluid. A main valve 14 is spring loaded to yieldingly shut off fluid flow between lines 10 and 12. Main valve 14 is controlled by a bleed flow through a bleed flow orifice 18 positioned between pressure line 10 and bleed flow end 16 of valve 14, and a variable orifice, more fully described below, formed between bleed flow orifice 18 and return flow line 12.

A pilot valve 20 controls the bleed flow and thereby the opening of main valve 14. Pilot valve 20 includes a pilot piston 22 mounted for movement in a pilot bore 24. Pilot bore 24 includes a pressure end 26 connected to load pressure through line 10, a bleed flow chamber 28 connected to bleed flow end 16 of valve 14, a drain chamber 30 connected to return flow, and a spring end 32 also connected to return flow. Pilot piston 22 is yieldingly urged toward pressure end 26 to shut off flow between bleed flow chamber 28 and drain chamber 30 by a spring member 34 positioned in spring end 32 of pilot bore 24.

Main valve 14 is mounted for movement in a main bore 36. Main bore 36 includes a return chamber 38 formed in one end thereof, a load pressure chamber 40 adjacent return chamber 38, a bleed chamber 42 spaced from return chamber 38 by pressure chamber 40, and a control pressure chamber 44 formed at the opposite end of main bore 36.

Return chamber 38 is connected to the return flow through line 12 with pressure chamber 40 connected to the load pressure source through line 10, bleed chamber 42 is connected to bleed flow chamber 28 of pilot bore 24 and through bleed flow orifice 18 through bleed flow line 46, and control pressure chamber 44 is connected to a source of control pressure through a control line 48.

Main valve 14 includes a main piston 50 mounted for movement in main bore 36. Main piston 50 is formed with a head end 51 having a tapered portion 52 extending into return chamber 38. Tapered portion 52 is adapted for engagement with a main valve seat 54 formed at the juncture of load pressure chamber 40 and main bore 36. A spring member 56 yieldingly urges main piston 50 in the direction of return chamber 38 to seat tapered portion 52 in engagement with main valve seat 54 to shut off fluid flow between load pressure chamber 40 and return chamber 38.

Main piston 50 includes a large area or rear end 58 and head end 51 contacts valve seat 54 at a diameter less than that of rear end 58 thereby forming a first differential area which is acted on by fluid pressure in load pressure chamber 40. The portion of head end 51 extending into return chamber 38 forms a second differential area which is acted on by fluid pressure in return chamber 38.

Main piston 50 further includes a counterbore 60 formed in rear end 58 and which together with the walls of main bore 36 define bleed chamber 42. A metering passage 62 formed through head end 51 provides a path for fluid flow between bleed chamber 42 and return chamber 38.

A poppet type servo valve 64 having a cone shaped end 65 extends from control chamber 44 in the direction of main piston 50 and is yieldingly urged by spring member 56 into seated engagement with metering passage 62 to shut off fluid flow therethrough. Movement of cone shaped end 65 into or out of engagement with metering passage 62 generates a variable orifice therebetween for metering fluid flow between bleed chamber 42 and return chamber 38.

A servo piston 66 associated with servo valve 64 is slidably mounted for movement relative thereto in control chamber 44. Servo piston 66 is yieldingly urged by a spring member 68 to resist movement thereof by control pressure in control chamber 44. Under the urging of control pressure in chamber 44 servo piston 66 acts on servo valve 64 against the force of spring members 56 and 68 to unseat the engagement of the servo valve 64 with metering passage 62.

METERING OPERATION AS A FLOW CONTROL VALVE

Metered flow, from load pressure to return, will be proportional to the applied control pressure, with this proportionality achieved in the following manner. Control pressure, acting on the exposed area of the servo piston 66, generates a force that moves the servo piston 66 and poppet valve 64 in a direction away from main piston 50 against the force of springs 56 and 68. Motion stops when the spring force becomes equal to the control pressure-generated force. Because the springs have a linear rate, displacement of the servo valve 64 will be proportional to the applied control pressure.

As servo valve 64 moves, it separates from main piston 50 allowing fluid flow through the variable orifice so formed and through metering passage 62 into return chamber 38. The resulting drop in pressure across metering passage 62 due to the variable orifice reduces the closing force on large area end 58 of main piston 50 to a lesser value than the opening force developed on the first differential area of piston 50 by the load pressure. The main piston 50, therefore, will move following the motion of the servo valve 64. As a steady-state condition, the flow area between the servo valve 64 and the variable orifice must result in a bleed flow rate through the variable orifice that develops a closing pressure on large area end 58 of main piston 50 that exactly balances the opening force on the first differential area of main piston 50. Since the gain ratio between the servo valve motion and bleed chamber 42 pressure is very high, the positional difference between the servo valve 64 and main piston 50 is negligible, and main piston 50 displacement may be considered as being directly proportional to applied control pressure. If the variable metering orifice in the main piston 50 is of constant width, metered flow will be proportional to piston displacement and to applied control pressure, assuming a constant pressure differential between load and return.

OPERATION AS A RELIEF VALVE

If the load pressure exceeds a predetermined "cracking" pressure, the pilot valve 20 will be displaced to open a flow path from the load pressure through bleed flow orifice 18, to return. This bleed flow reduces the pressure and closing force on large area end 58 of the main piston 50, and in the same manner as described above for flow control, the main piston will open, allowing flow from load to return. If load pressure tends to drop below the cracking pressure, pilot valve 20 will close, causing an increase in the pressure and closing force on the main piston 50.

OPERATION AS AN ANTI-CAVITATION VALVE

In the type of system for which this valve is intended, load pressure may drop below return line pressure as the result of an overhauling load. To prevent cavitation, the valve is designed to open in response to such a pressure differential, allowing fluid flow from the return line into the load circuit.

If return line pressure in return chamber 38, acting on the second differential area of main piston 50, generates a force exceeding the sum of the forces developed by load pressure acting on an equal area and spring 56, main piston 50 will move away from valve seat 54, opening a flow path from return to load. A free sliding fit between servo piston 66, and servo valve 64 and the use of two springs 56 and 68 allows the closing force exerted by servo valve 64 on main piston 50 to be held to a minimum and, therefore, requiring a relatively small pressure differential to open the main valve 14. Note that if servo valve 64 and servo piston 66 were one piece and only one spring having a force equal to the sum of forces of springs 56 and 68 were used, the other two functions of the valve, as described above, would not be significantly affected, but the higher spring force of the single spring would require an unacceptably high pressure differential to overcome it and open the valve.

Figure 2:
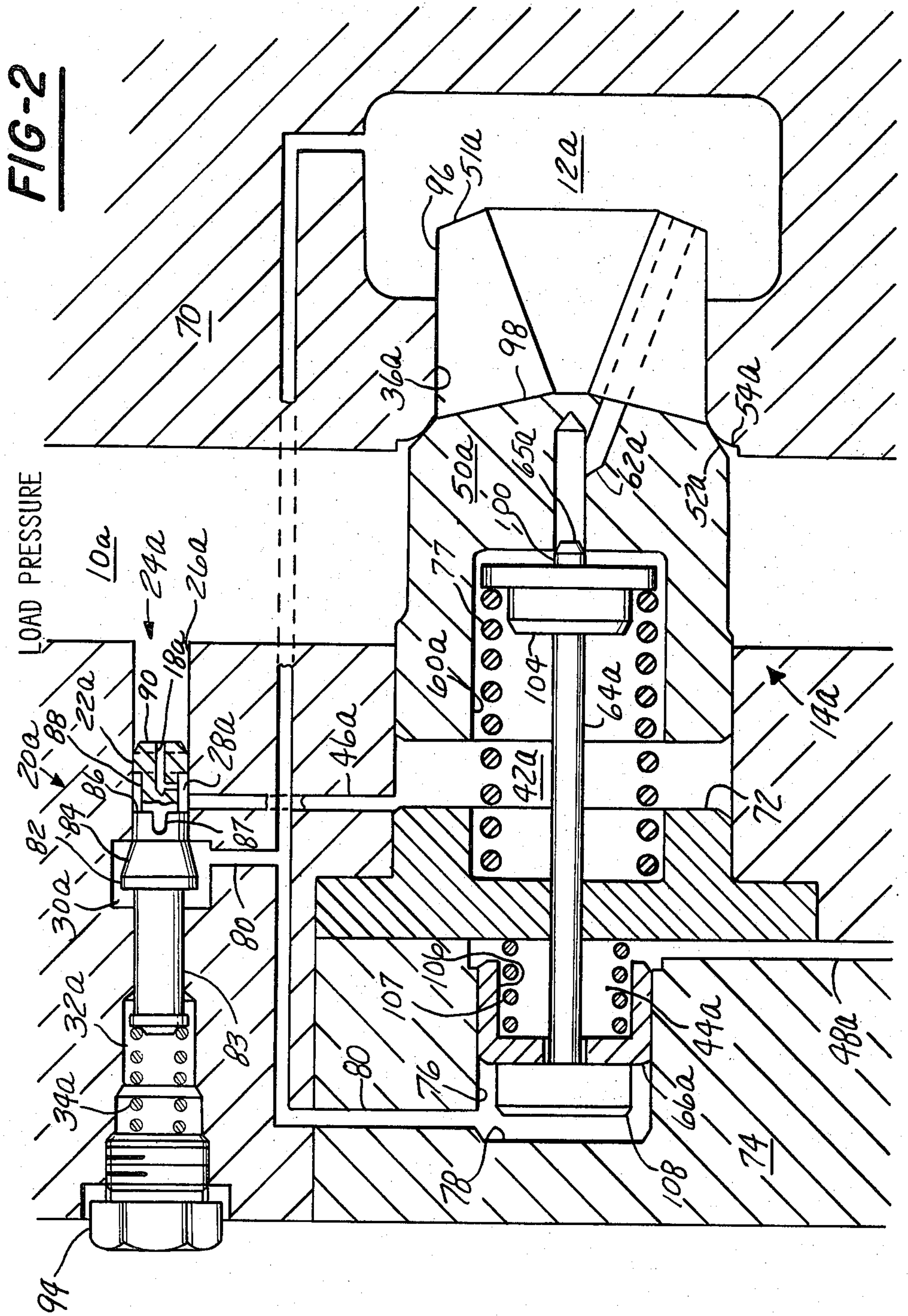
FIG. 2 is a diagramatic sectional view of a preferred embodiment of the invention.

FIG. 2 shows a preferred embodiment of the hydraulic control circuit of the instant invention as a unitary multiple function control valve wherein corresponding elements shown in FIG. 1 are provided with a suffix a.

The control valve circuit of FIG. 1 is shown housed in a body 70 which includes a load pressure passage 10*a* spaced from a return passage 12*a*. A main bore 36*a* formed in body 70 extends from return chamber or passage 12*a* through pressure passage 10*a* and terminates at a bearing member 72 held in position in main bore 36*a* by an end cap 74 portion of body 70. End cap portion 74 of body 70 includes a servo bore 76 spaced from main bore 36*a* by bearing member 72 and terminates at a distal end 78. A pilot bore 24*a* is formed in body 70 spaced from main bore 36*a* and includes a pressure end 26*a* in communication with and extending transverse of pressure passage 10*a*, a drain chamber 30*a*, and a spring end 32*a* spaced from pressure end 26*a* by drain flow chamber 30*a*.

Body 70 further includes a bleed flow passage 46*a* extending between main bore 36*a* adjacent bearing member 72 and in communication with pressure end 26*a* of pilot bore 24*a* through bleed flow orifice 18*a* adjacent drain chamber 30*a*, a drain passage 80 interconnecting distal end 78 of servo bore 76 and drain chamber 30*a* of pilot bore 24*a* with return passage 12*a*, and a control passage 48*a* in communication with servo bore 76 adjacent bearing member 72.

A pilot valve 20*a* is mounted for movement in pilot bore 24*a* and is yieldingly urged to shut off fluid flow between bleed flow passage 46*a* and metered flow passage 80. Pilot valve 20*a* includes a pilot piston 22*a* extending through pilot bore 24*a* between spring end 32*a* and pressure end 26*a*. Pilot piston 22*a* is of two-piece construction and includes a metering section 82 and spring end section 83. Section 82 is formed with a tapered portion 84 positioned in drain chamber 30*a* and seats in bore 24*a* to form a leakproof seal when system pressure is below the cracking pressure level of the pilot valve. Metering section 82 also includes a shoulder portion 86 extending into pressure end 26*a* of bore 24*a* in which one or more metering slots 87 are formed. A reduced diameter portion 88 of metering section 82 spaces shoulder portion 86 from a head portion 90 of metering section 82 defining therebetween a bleed flow chamber 28*a* and having slots 87 in communication therewith and in which one end of bleed flow passage 46*a* terminates. Bleed flow chamber 28*a* is in communication with pressure passage 10*a* through a bleed flow orifice 18*a* formed in head portion 90.

Spring end section 83 is held in abutting relationship with metering section 82 by a spring member 34*a* and is slightly smaller in diameter than shoulder portion 86 and head portion 90 of metering section 82. The differential area formed by the slight differences in diameters is acted on by load pressure in pressure end 22*a* generating a force tending to open the pilot valve against the force exerted by spring member 34*a*.

Spring member 34*a* is positioned in pilot bore 24*a* between spring end section 83 and an adjustment member 94 in threaded engagement with body 70. Adjustment member 94 provides a means for varying the amount of compression of spring 34*a* thereby providing for adjusting the cracking pressure level of the pilot valve.

A main piston 50*a* is movably mounted in main bore 36*a* to yieldingly shut off fluid flow between pressure passage 10*a* and return passage 12*a*. Main piston 50*a* includes a large area or rear end 58*a* and a spool section 96 extending from a tapered portion of piston 50*a* into return passage 12*a* and terminates at a head end 51*a*. Tapered portion 52*a* is adapted for seated engagement with a valve seat 54*a* formed on body 70 at the juncture of pressure passage 10*a* and main bore 36*a*. Spool section 96 is formed with a plurality of radial notches 98 terminating adjacent tapered portion 52*a*. Tapered portion 52*a* is proportioned for low leakage when in seated engagement with valve seat 54*a*. When fully closed, poppet action at tapered portion 52*a* on the valve seat 54*a* provides a virtually leak proof seal. As tapered portion 52*a* moves away from valve seat 54*a*, main piston 50*a* behaves as a sliding or spool type valve and fluid flow is metered through radial notches 98. By selective dimensioning of the width of radial notches 98, it is possible to control flow gain through the valve as contrasted to a very high flow gain that would result if the main piston was a pure poppet type valve with only poppet action between the main piston and the valve seat.

Fluid pressure in pressure passage 10*a* acts on main piston 50*a* on a first differential area formed by tapered portion 52*a* contacting valve seat 54*a* at a diameter less than that of rear end 58*a*. Fluid pressure in return passage 12*a* acts on a second differential area of main piston 50*a* formed by the radial surfaces of spool section 96 exposed to the fluid in the return passage.

Main piston 50*a* further includes a counterbore 60*a* formed in rear end 58*a* and a metering passage 62*a* extending from the bottom of counterbore 60*a* through spool section 96 into return passage 12*a*. Counterbore 60*a*, main bore 36*a*, and bearing member 72 define therebetween a bleed chamber 42*a* in main bore 36*a* which is connected to return passage 12*a* through metering passage 62*a* and to bleed flow chamber 28*a* in pilot bore 24*a* through bleed flow passage 46*a*.

A servo valve 64*a* having a stem portion 100 supported for sliding movement in bearing member 72 extends from servo bore 76 through bearing member 72 and terminates in cone shaped end 65*a*. Cone shaped end 65*a* is yieldingly urged into engagement with metering passage 62*a* to shut off fluid flow therethrough by a spring member 77 arranged in bleed chamber 42*a* between bearing member 72 and a spring seat 104 positioned on stem 100 adjacent cone end 65*a*. Movement of cone end 65*a* into or out of engagement with metering passage 12*a* generates a variable orifice therebetween for metering fluid flow between bleed chamber 42*a* and return passage 12*a*.

A servo piston 66*a* associated with poppet valve 64*a* is mounted for movement relative thereto in servo bore 76. Servo piston 66*a* includes a counterbore 106 which together with bearing member 72 and the walls of servo bore 76 define a control pressure chamber 44*a* in communication with control pressure passage 48*a*. A relatively light spring member 107 positioned between bearing member 72 and the bottom of counterbore 106 keeps servo piston 66*a* in contact with a shoulder portion 108 of servo valve 64*a* and prevents servo piston 66*a* from blocking passage 48*a*. Under the urging of control pressure in chamber 44*a*, servo piston 66*a* acts to unseat cone end 65*a* through shoulder portion 108 for controlling the variable orifice metering action of the servo valve 64*a*.

Note that in this embodiment, spring member 77 combines the functions of springs 56 and 68 shown and described above in relation to FIG. 1. As previously mentioned, the resulting higher spring force limits the use of this embodiment as an anti-cavitation check valve.

One of the features of the control valve is low leakage in the shut off position. The seats between main piston 50*a* and body 70 and poppet valve 64*a* and metering orifice 62*a* can be considered as positive seals with zero leakage. With reasonable tolerances very low leakage rates can be maintained.

It will be apparent to those skilled in the art that many changes may be made to the above described invention without departing from the spirit of the invention and the scope of the appended claims.

Figure 3:
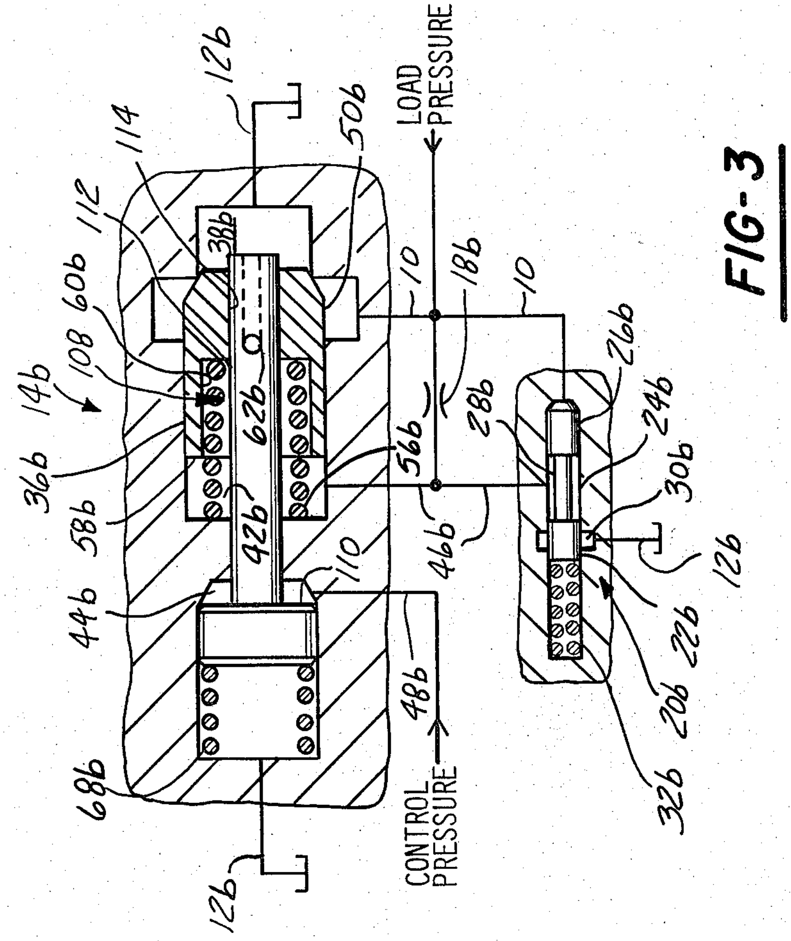
FIG. 3 is another embodiment of the hydraulic circuit of FIG. 1.

One such change, by way of example, is shown in FIG. 3 wherein like elements have the same reference numerals as in FIG. 1 with the suffix b added.

FIG. 3 shows a spool type servo valve 108 in place of the servo piston 66 and poppet type servo valve 64 of FIG. 1. Servo valve 108 includes a piston end 110 positioned in control chamber 44*b*, a spool member 112 extending from piston end 110 into and through a bore 114 formed in main piston 50*b*, and having a metering passage 62*b* formed therein in communication with return chamber 38*b* through the end of spool member 112 positioned in bore 114. Servo valve 108 is mounted for movement in bore 114 and is yieldingly urged by spring member 68*b* to shut off fluid flow between bleed chamber 42*b* and return chamber 38*b* through metering passage 62*b*. Servo valve 108 is operable by control pressure applied to piston end 110 for generating a variable orifice as passage 62*b* is exposed to bleed chamber 42*b* thereby metering fluid flow through metering passage 62*b* between bleed chamber 42*b* and return chamber 38*b*.

Servo valve 108 has the advantages that system pressure forces have less effect on the spool type valve force balance than on the poppet type valve force balance and movement of servo valve 108 is not required when the circuit is functioning as a relief valve. A disadvantage of the spool type valve, as previously mentioned, is that it is susceptible to leakage through the clearances between bore 114 and spool member 112.

What is claimed is:

1. A multiple function hydraulic control circuit comprising:

a. a source of load pressure and a return flow line;

b. a main valve having a metering passage formed therethrough and operable to shut off fluid flow between said source of load pressure and said return flow line;

c. a bleed flow orifice connected to said source of load pressure and to said main valve for restricting fluid flow to said main valve;

d. pilot valve means connected to said source of system pressure and said main valve for metering fluid flow restricted by said bleed flow orifice to said return flow line; and e. servo means associated with said main valve including a servo piston operatively connected to a source of control pressure and a servo valve engaging said metering passage and operatively associated with said servo piston, said servo valve adapted for movement by said main valve independently of said servo piston, and said servo piston operable for controlling engagement of said servo valve with said metering passage for metering said restricted fluid flow to said return flow line through said metering passage.

2. The circuit of claim 1 wherein said main valve includes a main piston and a bleed chamber, with said metering passage located in said main piston between said bleed chamber and said return flow line, and said servo valve being yieldingly urged to shut off fluid flow through said metering passage.

3. The circuit of claim 1 wherein movement of said servo valve into or out of engagement with said metering passage in response to operation of said servo piston by said control pressure generates a variable orifice therebetween.

4. The circuit of claim 3 wherein said servo valve is a poppet type valve having a cone shaped end yieldingly urged into seated engagement with said metering passage and wherein movement of said cone shaped end into or out of engagement with said metering passage generates said variable orifice.

5. The circuit of claim 4 wherein said servo piston is associated with said poppet type valve, said servo piston being slidably mounted for movement relative to said poppet type valve and under the urging of said control pressure acts on said poppet type valve to unseat said cone shaped end from engagement with said metering passage to generate said variable orifice.

6. The circuit of claim 3 wherein a bore is formed in said main piston between said bleed chamber and said return flow line, and wherein said servo valve is a spool type valve having said metering passage formed therein in communication with said return flow line and movably mounted in said bore.

7. The circuit of claim 6 wherein said spool type valve is operable by said control pressure for generating said variable orifice as said metering passage is exposed to said bleed chamber.

8. A multiple function hydraulic control valve comprising:

a. a main valve having a metering passage formed therethrough and operable to shut off fluid flow between a source of load pressure and a return flow line;

b. a bleed flow orifice connected between said source of load pressure and said main valve for restricting fluid flow to said main valve; and c. servo means associated with said main valve including a servo piston operatively connected to a source of control pressure and a servo valve engaging said metering passage and operatively associated with said servo piston, and servo valve adapted for movement by said main valve independently of said servo piston, and said servo piston operable for controlling engagement of said servo valve with said metering passage for metering said restricted fluid flow to said return flow line through said metering passage.

9. The circuit of claim 8 wherein said main valve includes a main piston and a bleed chamber, with said metering passage located in said main piston between said bleed chamber and said return flow line, and said servo valve being yieldingly urged to shut off fluid flow through said metering passage.

10. The circuit of claim 8 wherein movement of said servo valve into or out of engagement with said metering passage in response to operation of said servo piston by said control pressure generates a variable orifice therebetween.

11. The circuit of claim 10 wherein said servo valve is a poppet type valve having a cone shaped end yieldingly urged into seated engagement with said metering passage and wherein movement of said cone shaped end into or out of engagement with said metering passage generates said variable orifice.

12. The circuit of claim 11 wherein said servo piston is associated with said poppet type valve, said servo piston being slidably mounted for movement relative to said poppet type valve and under the urging of said control pressure acts on said poppet type valve to unseat said cone shaped end from engagement with said metering passage to generate said variable orifice.

13. The circuit of claim 10 wherein a bore is formed in said main piston between said bleed chamber and said return flow line, and wherein said servo valve is a spool type valve having said metering passage formed therein in communication with said return flow line and movably mounted in said bore.

14. The circuit of claim 13 wherein said spool type valve is operable by said control pressure for generating said variable orifice as said metering passage is exposed to said bleed chamber.

15. A multiple function hydraulic control valve comprising:

a. a body;

b. a pressure passage and a return passage formed in said body;

c. a main bore formed in said body extending between said pressure and said return passages;

d. a servo bore formed in said body in aligned relationship to said main bore;

e. a pilot bore formed in said body spaced from said main bore in communication with said pressure passage;

f. a bleed flow passage formed in said body extending from said main bore into said pilot bore;

g. a drain passage formed in said body extending from said servo bore and said pilot bore to said return passage;

h. a control pressure passage formed in said body in communication with said servo bore;

i. a pilot valve mounted for movement in said pilot bore yieldingly urged to shut off fluid flow between said bleed flow passage and said drain passage;

j. a bleed flow orifice positioned in said body between said pressure passage and said bleed flow passage to restrict fluid flow from said pressure passage to restrict fluid flow from said pressure passage to said bleed flow passage;

k. a metering slot formed in said pilot valve adapted upon movement of said pilot valve to meter fluid flow from said bleed flow passage to said drain passage;

l. a main valve mounted for movement in said main bore yieldingly urged to shut off fluid flow between said pressure passage and said return passage; and m. a metering passage positioned in said main valve between said bleed flow passage and said return passage; and n. a servo piston movably mounted in said servo bore operatively connected to a source of control pressure and a servo valve engaging said metering passage and operatively associated with said servo piston, said servo valve adapted for movement by said main valve independently of said servo piston, and said servo piston operable for controlling engagement of said servo valve with said metering passage for generating a variable orifice to meter fluid flow through said metering passage.

16. The control valve of claim 15 wherein said main valve includes a main piston and a bleed chamber, said main piston having said metering passage formed therethrough and said bleed flow chamber being connected to said return passage through said metering passage and to said bleed flow passage through said main bore, and wherein said servo valve is yieldingly urged into seated engagement with said metering passage to shut off fluid flow between said bleed chamber and said return passage.

17. The control valve of claim 16 wherein said servo piston is mounted for movement relative to said servo valve in said servo bore, and wherein under the urging of control pressure applied to said servo piston said servo piston acts on said servo valve to unseat engagement of the servo valve with said metering passage.

18. The control valve of claim 17 wherein said servo valve includes a stem member having a cone shaped end adapted for seated engagement with said metering passage, and wherein a first spring member urges said cone shaped end into engagement with said metering passage.

19. The control valve of claim 18 wherein said stem member includes a shoulder portion spaced from said cone shaped end and positioned in said servo bore in abutting relationship with said servo piston and said servo piston acts on said shoulder portion to unseat said cone shaped end from engagement with said metering passage.

20. The control valve of claim 19 wherein said servo valve further includes a spring seat member adjacent said cone shaped end in said bleed chamber, and wherein said first spring member is arranged within said bleed chamber in engagement with said spring seat member yieldingly urging said cone shaped end in seated engagement with said metering passage.

21. The control valve of claim 20 wherein a second spring member arranged in said servo bore in engagement with said servo piston maintains said servo piston in said abutting relationship with said shoulder portion and prevents said servo piston from blocking communication of said control passage with said servo bore.

22. The control valve of claim 21 wherein a first counterbore formed in said main piston forms part of said bleed chamber, and said spring seat and said first spring member are arranged in said first counterbore.

23. The control valve of claim 22 wherein a control pressure chamber is formed in said servo bore adjacent said control pressure passage, and wherein a second counterbore formed in said servo piston form part of said control pressure chamber and said second spring is arranged in said second counterbore.

24. The circuit or valve of claim 1 or 15 wherein load pressure exceeding a predetermined value acts on said pilot valve means to affect said movement of the servo valve by said main valve independently of said servo piston.

25. The circuit or valve of claim 1, 8, or 15 wherein fluid pressure in said return flow line affects said movement of the servo valve by said main valve independently of said servo piston.

* * * * *